(12) United States Patent
Kawauchi et al.

(10) Patent No.: US 8,820,706 B2
(45) Date of Patent: Sep. 2, 2014

(54) VALVE DEVICE

(75) Inventors: Hideki Kawauchi, Shioya-gun (JP);
Takuya Wakabayashi, Wako (JP);
Takuma Kanazawa, Wako (JP)

(73) Assignees: Keihin Corporation, Tokyo (JP);
Honda Motor Co., Ltd., Tokyo (JP)

( * ) Notice: Subject to any disclaimer, the term of this patent is extended or adjusted under 35 U.S.C. 154(b) by 30 days.

(21) Appl. No.: 13/557,317

(22) Filed: Jul. 25, 2012

(65) Prior Publication Data

US 2013/0026406 A1    Jan. 31, 2013

(30) Foreign Application Priority Data

Jul. 27, 2011    (JP) ................................. 2011-164136

(51) Int. Cl.
*F16K 25/00*    (2006.01)
*F16K 5/20*    (2006.01)
(52) U.S. Cl.
CPC ....................................... *F16K 5/205* (2013.01)
USPC ....................................... 251/180; 251/315.01
(58) Field of Classification Search
USPC .............. 251/176, 180, 185, 192, 314, 315.01
See application file for complete search history.

(56) References Cited

U.S. PATENT DOCUMENTS 3,771,545 A * 11/1973 Allen ......................... 137/315.21
3,870,071 A *  3/1975 Graham et al. ................ 137/527
7,275,564 B2 * 10/2007 Bazin et al. ............... 137/625.47

FOREIGN PATENT DOCUMENTS

| CN | 2515473 Y | 10/2002 |
| CN | 201496613 U | 6/2010 |
| CN | 201531642 U | 7/2010 |
| JP | 63-009150 B2 | 2/1988 |
| JP | 2008-232260 A | 10/2008 |

* cited by examiner

*Primary Examiner* — John K Fristoe, Jr.
*Assistant Examiner* — Kevin E Lynn
(74) *Attorney, Agent, or Firm* — Westerman, Hattori, Daniels & Adrian, LLP

(57) ABSTRACT

The on-off valve includes a body having a fluid path, a spherical valve body opening and closing the fluid path, a guide member opposing the valve body and having a flange portion radially extending outward, a first seat member slidable along an outer peripheral surface of the guide member and seating the valve body, an O-ring disposed between the first seat member and the guide member, a chamber formed of an inner wall portion of the fluid path, the outer peripheral surface, the flange portion, and the first seat member, and a spring member disposed in the chamber and urging the first seat member toward the valve body. In the on-off valve, a gap portion is formed between the inner wall portion and the first seat member and connects the valve body side of the fluid path to the chamber.

3 Claims, 4 Drawing Sheets

Fig. 4
(a)
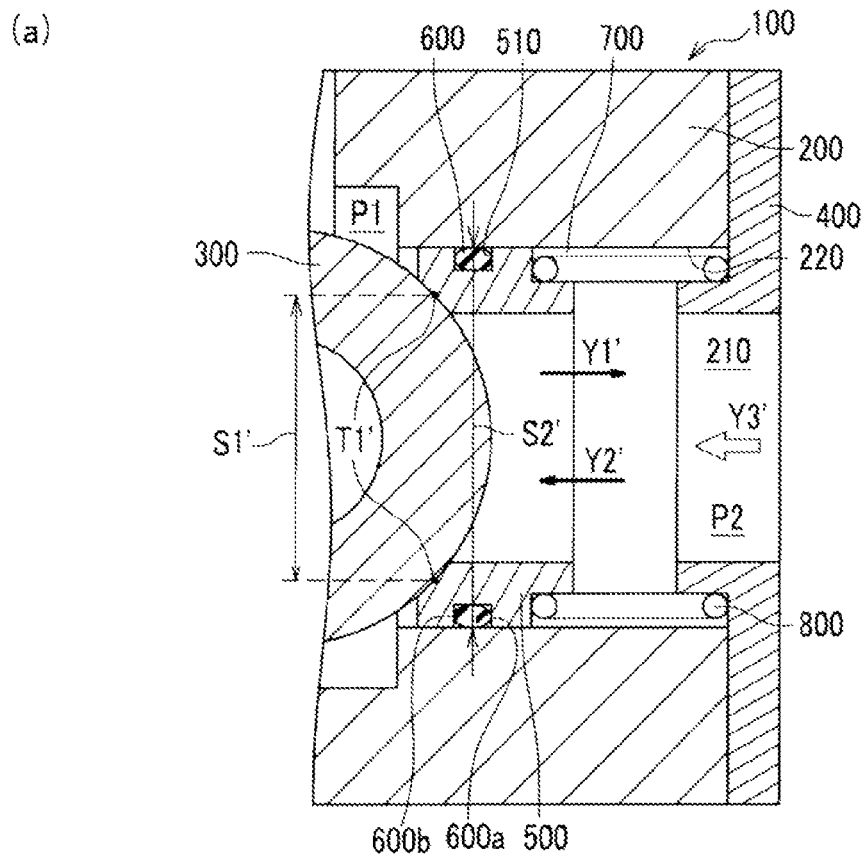
(b)
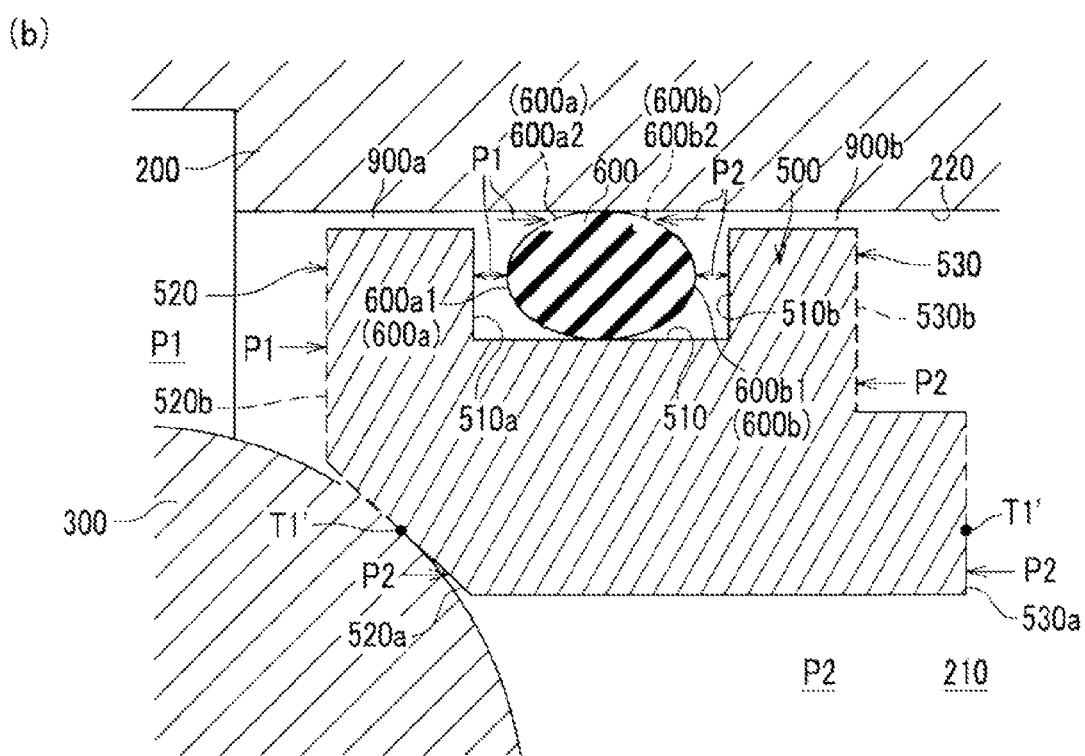

VALVE DEVICE

CROSS-REFERENCE TO RELATED APPLICATIONS

The present application claims priority under 37 U.S.C. §119 to Japanese Patent Application No. 2011-164136, filed Jul. 27, 2011, entitled "VALVE DEVICE". The contents of this application are incorporated herein their entirety.

TECHNICAL FIELD

The present invention relates to a valve device.

Description of the Related Art

There is a known ball valve (valve device) that is disposed in a fluid path, through which a fluid flows, and has a valve body that opens and closes the fluid path (see, for example, Japanese Examined Patent Application Publication No. 63-9150).

FIGS. 4A and 4B illustrate the structure of such a related-art ball valve. FIG. 4A is a general longitudinal sectional view of the related-art ball valve (valve device). FIG. 4B is an enlarged view of part of the structure illustrated in FIG. 4A, illustrating forces exerted on a seat member and an O-ring.

As illustrated in FIG. 4A, a related-art ball valve (valve device) 100 includes a body 200, a sphere-shaped valve body 300, a guide member 400, a seat member 500, an O-ring 600, and a spring member 800. The body 200 has a fluid path 210 therein. The valve body 300 is disposed in the fluid path 210 and opens and closes the fluid path 210. The guide member 400 is disposed in the axial direction of the fluid path 210 so as to be spaced apart from the valve body 300 by a specified distance. The seat member 500 is disposed between the valve body 300 and the guide member 400 so as to allow the valve body 300 to be seated. The O-ring 600 is fitted into a groove portion 510 formed in an outer peripheral surface of the seat member 500 so as to seal a gap between an inner wall portion 220 of the fluid path 210 and the outer peripheral surface of the seat member 500. The spring member 800 is disposed in a chamber 700 formed between the guide member 400 and the seat member 500 so as to urge the seat member 500 toward the valve body 300. That is, the related-art ball valve 100 has a structure in which the seat member 500 presses the valve body 300 using the urging force Y2' of the spring member 800 so as to obtain seating properties of the seat member 500 with respect to the valve body 300.

When the above-described ball valves 100 are installed in a variety of systems, in some cases pressure on the seat member 500 side of the fluid path 210 becomes negative, and as a result, pressure on the valve body 300 side of the fluid path 210 (hereafter, referred to as a "valve side pressure P1") becomes higher (P1>P2) than pressure on the seat member 500 side (hereafter, referred to as a "seat member side pressure P2").

In this state, as illustrated in FIG. 4B, the seat member side pressure P2 is exerted on a portion 520a and a portion 530a. The portion 520a is part of a second axial end surface 520 of the seat member 500 radially further toward the inside than a contact portion T1', which is in contact with the valve body 300. The portion 530a is part of a first axial end surface 530 radially further toward the inside than a projected position on the first axial end surface 530, the projected position being a position at which the contact portion T1' is projected. Since a pressure receiving area of the portion 520a is equal to (substantially equal to) a pressure receiving area of the portion 530a, a pressing force exerted on the portion 520a of the second axial end surface 520 in a direction in which the seat member 500 is moved away from the valve body 300 by the seat member side pressure P2 and a pressing force exerted on the portion 530a of the first axial end surface 530 in a direction in which the seat member 500 is moved toward the valve body 300 by the seat member side pressure P2 cancel each other out.

Since a fluid on the seat member 500 side flows into the groove portion 510 through a gap 900b, which is formed between the seat member 500 and the inner wall portion 220 of the fluid path 210, the seat member side pressure P2 is exerted on a side surface portion 510b of the groove portion 510 and a first pressure receiving surface 600b of the O-ring 600. Since a pressure receiving area of the side surface portion 510b is equal to (substantially equal to) a pressure receiving area of a portion 600b1, which is part of the first pressure receiving surface 600b other than the part of the first pressure receiving surface 600b corresponding to the gap 900b, a pressing force exerted on the side surface portion 510b in a direction in which the seat member 500 is moved away from the valve body 300 by the seat member side pressure P2 and a pressing force exerted on the portion 600b1 of the first pressure receiving surface 600b in a direction in which the seat member 500 is moved toward the valve body 300 by the seat member side pressure P2 cancel each other out.

Furthermore, since the fluid on the valve body 300 side flows into the groove portion 510 (more specifically, into a portion of the groove portion 510 opposite to the side surface portion 510b with the O-ring 600 interposed therebetween) through a gap 900a, the valve side pressure P1 is exerted on a side surface portion 510a of the groove portion 510 and a second pressure receiving surface 600a of the O-ring 600. Since a pressure receiving area of the side surface portion 510a is equal to (substantially equal to) a pressure receiving area of a portion 600a1, which is part of the second pressure receiving surface 600a other than the part of the second pressure receiving surface 600a corresponding to the gap 900a, a pressing force exerted on the side surface portion 510a in a direction in which the seat member 500 is moved toward the valve body 300 by the valve side pressure P1 and a pressing force exerted on the portion 600a1 of the second pressure receiving surface 600a in a direction in which the seat member 500 is moved away from the valve body 300 by the valve side pressure P1 cancel each other out.

The valve side pressure P1 acting in a direction in which the seat member 500 is moved away from the valve body 300 is exerted on a portion 520b (see dashed lines in FIG. 4B), which is part of the second axial end surface 520 of the seat member 500 radially further toward the outside than the contact portion T1', and the seat member side pressure P2 acting in a direction in which the seat member 500 is moved toward the valve body 300 is exerted on a portion 530b (see dashed lines in FIG. 4B), which is part of the first axial end surface 530 radially further toward the outside than the projected position on the first axial end surface 530, the projected position being a position at which the contact portion T1' is projected.

Furthermore, the valve side pressure P1 is exerted on a portion 600a2 (see a dashed line in FIG. 4B), which is part of the second pressure receiving surface 600a of the O-ring 600 corresponding to the gap 900a, and the seat member side pressure P2 is exerted on a portion 600b2 (see a dashed line in FIG. 4B), which is part of the first pressure receiving surface 600b corresponding to the gap 900b.

Accordingly, a pressure receiving area of the portion 520b of the second axial end surface 520 is equal to (substantially equal to) a pressure receiving area of the portion 530b of the first axial end surface 530, and a pressure receiving area of the portion 600a2 of the second pressure receiving surface 600a is equal to (substantially equal to) a pressure receiving area of the portion 600b2 of the first pressure receiving surface 600b. In addition, the valve side pressure P1 is higher than the seat member side pressure P2. Thus, there exist portions of the seat member 500 and the O-ring 600 where pressing forces exerted thereon are not canceled out (see the dashed lines in FIG. 4b).

Referring to FIG. 4A, a pressure receiving area of the portions where pressing forces exerted thereon are not canceled out is given by subtracting S1' from S2' (S2'-S1'), where S2' is an inner diameter area of the cross section of the inner wall portion 220 of the body 200, and S1' is an area of the cross section of the part of the seat member 500 radially further toward the inside than the contact portion T1', which is in contact with the valve body 300. It is noted that the area S1' refers to a cross-sectional area including a cross-sectional area of the a hole portion formed in a central portion of the seat member 500.

With the above-described structure, a force ((P1−P2)×(S2'−S1')=force Y1' due to differential pressure) in a direction in which the seat member 500 is moved away from the valve body 300 is exerted on the seat member 500. As a result, a force Y3', by which the valve body 300 is pressed by the seat member 500 (load applied to the valve body 300), is decreased by the amount of the force Y1' due to this differential pressure. Thus, there is a problem in that the seating properties of the seat member 500 with respect to the valve body 300 are degraded.

SUMMARY OF THE INVENTION

The urging force (spring load) Y2' of the spring member 800 may be increased with consideration of the amount of a decrease in the load Y3' applied to the valve body 300.

However, when the urging force of a spring member is increased, a seating surface of a seat member is strongly pressed against a valve body. This causes a situation in which operational friction during rotation of the valve body is increased and the valve body and the seating surface of the seat member slide over each other in a forceful manner during rotation of the valve body. Thus, there is a problem in that, for example, wear of the seat member increases.

A valve device is provided with which the urging force of the spring member can be preferably set and seating properties of the seat member with respect to the valve can be constantly maintained.

The valve device includes a body having a fluid path in the body, a sphere-shaped valve that is disposed in the fluid path and opens and closes the fluid path, a guide member that is disposed so as to oppose the valve in the axial direction of the fluid path and has a support portion on an outer peripheral surface of the guide member. The support portion extends in a direction substantially perpendicular to the axial direction. The valve device also includes a cylinder-shaped seat member disposed such that the seat member is slidable along the outer peripheral surface of the guide member. The valve is seated on the seat member. The valve device also includes a sealing member disposed between an inner peripheral surface of the seat member and the outer peripheral surface of the guide member and a chamber, which is surrounded by an inner wall portion of the fluid path, the outer peripheral surface of the guide member, the support portion, and the seat member. The valve device also includes a spring member that is disposed in the chamber and urges the seat member toward the valve. In the valve device, a communicating portion is formed between the inner wall portion of the fluid path and the seat member. The communicating portion allows communication between the valve side of the fluid path and the chamber.

The sealing member is disposed on an inner diameter side of the seat member, and a communicating portion, which allows communication between the valve side of the fluid path and the chamber, is formed between the inner wall portion of the fluid path and the seat member. Thus, on the seat member side of the fluid path, a fluid (for example, atmosphere) on the valve side of the fluid path flows into the chamber through the communicating portion. Accordingly, pressure of the chamber (hereafter, referred to as "chamber pressure P3") becomes equal to (substantially equal to) the valve side pressure P1, and higher than the seat member side pressure P2. As a result, the chamber pressure P3 is exerted on portions of the seat member and the sealing member, the portions existing on sides opposite to the valve. Compared to the related-art (Japanese Examined Patent Application Publication No. 63-9150), in the seat member and the sealing member, portions where pressing forces exerted thereon are canceled out can be increased and portions where pressing forces exerted thereon are not canceled out can be decreased, thereby permitting the force acting in a direction separating away from the valve to be decreased. Thus, seating properties of the seat member on the seat member side of the fluid path are improved. As a result, compared to the related art, the urging force of the spring member does not need to be increased. Accordingly, an increase in operational friction during rotation of the valve can be prevented and an increase in wear of the seat member can be prevented, thereby permitting the life of the seat member to be increased.

A valve device with which the urging force of the spring member can be preferably set and seating properties of the seat member with respect to the valve can be constantly maintained can be provided.

BRIEF DESCRIPTION OF THE DRAWINGS

The advantages of the invention will become apparent in the following description taken in conjunction with the drawings, wherein:

FIG. 4A is a general longitudinal sectional view of a related-art ball valve (valve device), and FIG. 4B is an enlarged view of part of the ball valve illustrated in FIG. 4A, illustrating forces exerted on a seat member and an O-ring.

DETAILED DESCRIPTION OF THE INVENTION

An embodiment will be described in detail with reference to the drawings. In the following description, the same elements are denoted by the same reference signs and redundant description thereof is omitted.

Figure 1:
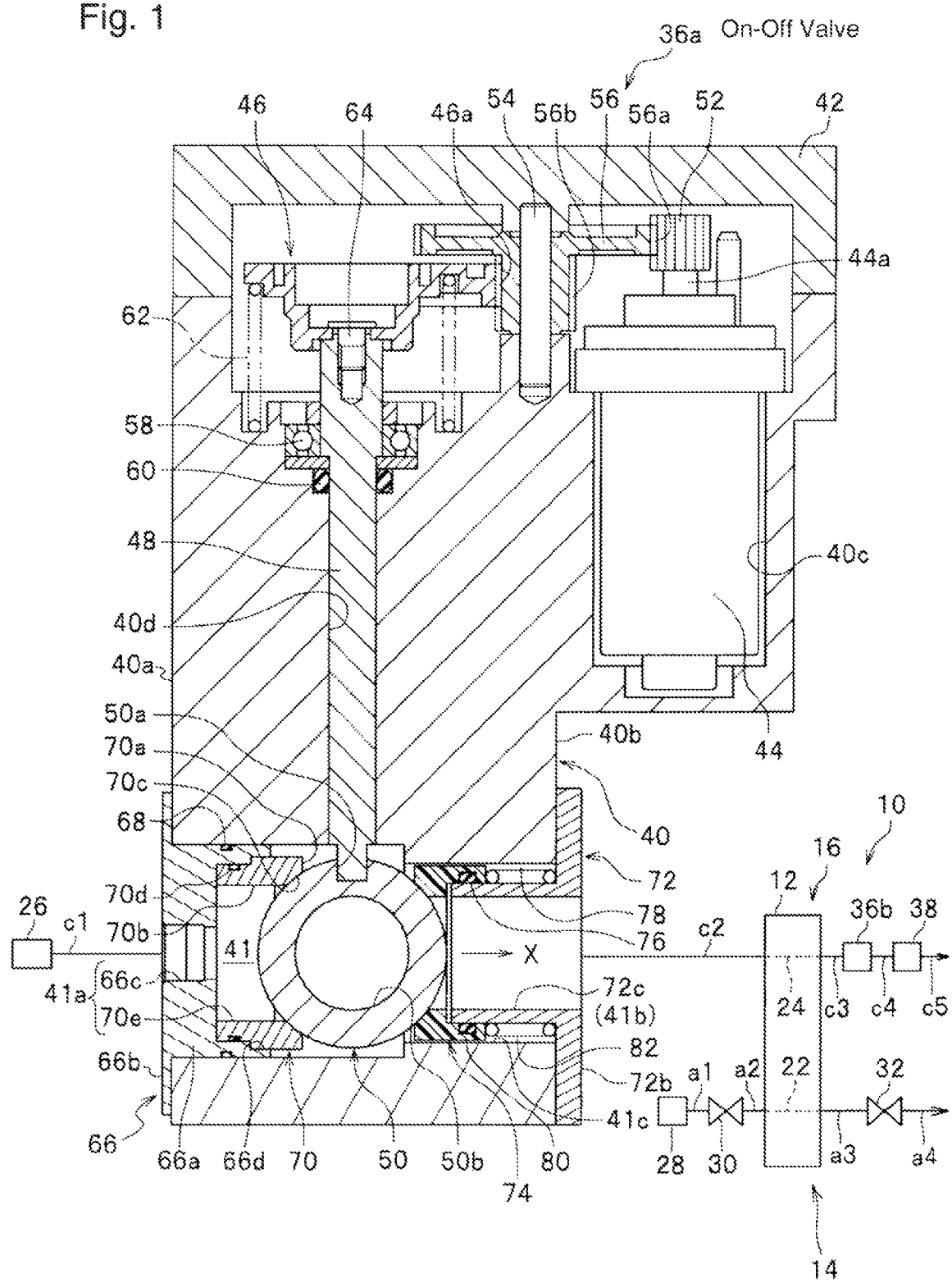
FIG. 1 is a general longitudinal sectional view of a valve device (on-off valve), the valve device being incorporated in a fuel cell system.

FIG. 1 is a general longitudinal sectional view of a valve device (on-off valve). The valve device is incorporated in a fuel cell system. In the present embodiment, an example of the valve device incorporated in the fuel cell system installed in a vehicle will be described below. However, the valve device is not limited to this. The valve device is applicable to any of a variety of valve devices incorporated in stationary fuel cell units and the like for, for example, ships and aircrafts, and for business use and home use.

As illustrated in FIG. 1, the valve device according to the present embodiment is incorporated in a fuel cell system 10. The fuel cell system 10 includes a fuel cell unit 12, an anode system 14, a cathode system 16, a control system (not shown), and so forth. In the following description, an example is described, in which the valve device according to the present embodiment is applied to an on-off valve 36a of the cathode system 16 of the fuel cell system 10.

The fuel cell unit (fuel cell stack) 12 includes polymer electrolyte fuel cells (PEFCs). In the fuel cell unit 12, a plurality of single cells, which are each formed of a membrane electrode assembly (MEA) and separators (not shown) that hold the MEA therebetween, are stacked. The MEA includes an electrolyte membrane (solid polymer membrane), a cathode, an anode, and so forth. The electrolyte membrane is held between the anode and cathode. The cathode and the anode are each formed of, for example, an electrocatalytic layer in which a catalyst such as platinum is carried by a catalyst carrier such as carbon black. Each separator has an anode channel 22 and a cathode channel 24, which are defined by grooves or through holes.

In such a fuel cell unit 12, when hydrogen (a reactant gas and a fuel gas) is supplied to the anode and air (a reactant gas and an oxidant gas) including oxygen is supplied to the cathode, an electrode reaction occurs in the catalysts included in the anode and the cathode, thereby setting the fuel cell unit 12 to a state in which power can be generated.

The fuel cell unit 12 is electrically connected to an external load (not shown). When current is picked up by the external load, the fuel cell unit 12 generates power. Examples of the external load include a drive motor, electricity storage devices such as battery and a capacitor, and an air pump 26, which will be described later.

The anode system 14 includes a hydrogen tank 28, a shutoff valve 30, a purge valve 32, pipes a1 to a4, and so forth.

The hydrogen tank 28 stores a highly pure hydrogen under high pressure and is connected to the shutoff valve 30, which is disposed on a downstream side of the hydrogen tank 28, through the pipe a1. The shutoff valve 30 uses, for example, a solenoid valve and connected to an inlet of the anode channel 22 of the fuel cell unit 12, the anode channel 22 being disposed on a downstream side of the shutoff valve 30, through the pipe a2.

The purge valve 32 uses, for example, a solenoid valve and connected to an outlet of the anode channel 22 of the fuel cell unit 12, the anode channel 22 being disposed on an upstream side of the purge valve 32 through the pipe a3.

The cathode system 16 includes the air pump 26, the on-off valves 36a and 36b, a back pressure valve 38, pipes (oxidant gas channels) c1 to c5, and so forth.

The air pump 26 uses, for example, a mechanical supercharger driven by a motor (not shown). The air pump 26 compresses outside air (air) taken therein and supplies the outside air to the fuel cell unit 12.

The on-off valve 36a is provided on a side from which an oxidant gas is supplied. The on-off valve 36a is connected to the air pump 26, which is disposed on an upstream side of the on-off valve 36a, through the pipe c1 and also connected to an inlet of the cathode channel 24 of the fuel cell unit 12, the cathode channel 24 being disposed on a downstream side of the on-off valve 36a, through the pipe c2. The on-off valve 36b is provided on a side to which the oxidant gas is discharged. The on-off valve 36b is connected to an outlet of the cathode channel 24 of the fuel cell unit 12, the cathode channel 24 being disposed on an upstream side of the on-off valve 36b, through the pipe c3 and also connected to the back pressure valve 38, which is disposed on a downstream side of the on-off valve 36b through the pipe c4.

The back pressure valve 38 is connected to the outlet side of the cathode channel 24. The back pressure valve 38 regulates the amount of the air discharged to an atmosphere side through a diluter (not shown) disposed on a downstream side of the back pressure valve 38 and, at the same time, controls the pressure of the air supplied to the cathode channel 24 of the fuel cell unit 12.

Next, the embodiment of the on-off valve 36a incorporated in the fuel cell system 10 will be described in detail with reference to the drawings. An arrow X in FIG. 1 indicates a direction in which a fluid flows.

As illustrated in FIG. 1, the on-off valve 36a includes a body 40 and a housing 42, which is secured to an upper side of the body 40 with bolts (not shown). The body 40 and the housing 42 house a rotation drive source 44, a gear plate 46, a shaft 48, a valve body 50, a holding member 66, a second seat member 70, a guide member 72, a first seat member 74, and so forth.

A fluid path 41 extends through the inside of a lower portion of the body 40 from a second surface 40a to a first surface 40b. The holding member 66, the second seat member 70, the valve body 50, the first seat member 74, and the guide member 72 are disposed along the fluid path 41 in this order from upstream to downstream in the fluid flow direction X.

The holding member 66 and the second seat member 70 respectively have hole portions 66c and 70e formed therethrough in the axial direction. The hole portions 66c and 70e each have a circle-shaped section and define an entry path 41a. The guide member 72 has a hole portion 72c having a circle-shaped section formed therethrough in the axial direction. The hole portion 72c defines an exit path 41b. The pipe c1 is connected to the entry path 41a and the pipe c2 is connected to the exit path 41b.

The rotation drive source 44 is suitably selected from among known DC motors, stepping motors, brushless DC or AC motors, and the like. The rotation drive source 44 is housed in a recess 40c formed in the body 40. The rotation drive source 44 has an output shaft 44a, to which a drive gear 52 is secured. The drive gear 52 is engaged with a large diameter gear portion 56a formed in an idle gear 56, which is rotatably supported by the idle shaft 54.

The shaft 48, which serves as a valve shaft, is inserted through a support hole 40d formed in the body 40. The valve body 50, which opens and closes the fluid path 41, is coupled to a portion of the shaft 48 such that the valve body 50 is positioned in the fluid path 41. One of axial ends of the shaft 48 is fitted into a recess 50a formed in an upper portion of the valve body 50. The valve body 50 has a spherical shape corresponding to the sectional shape of the fluid path 41 and has a circle-shaped through hole 50b extending therethrough along the center axis thereof. FIG. 1 illustrates a state in which the valve body 50 is held at a completely closed position at which the valve body 50 completely closes the fluid path 41.

With the above-described structure, when the rotation drive source 44 is driven and, accordingly, the valve body 50 is rotated together with the shaft 48, the through hole 50b communicates with the entry path 41a and the exit path 41b. Thus, a valve open state is entered, in which the fluid can flow through the fluid path 41.

The shaft 48, to which the valve body 50 is secured, is rotatably supported by the body 40 through a bearing 58. The body 40 has a sealing member 60 attached thereto so that gas is prevented from leaking from the fluid path 41 to a space portion of the body 40, in which components such as the gear plate 46 are housed.

A spring member 62 is provided in an outer peripheral portion of the shaft 48 on the gear plate 46 side. The spring member 62 urges the valve body 50 to rotate in a direction in which the valve body 50 is closing the fluid path 41. That is, the on-off valve 36a herein is a normally closed valve device, with which the valve body 50 is held at the completely closed position at which the valve body 50, due to the urging force of the spring member 62, completely closes the fluid path 41 in a normal state (state in which the rotation drive source 44 is not energized).

The gear plate 46 is secured to the other axial end portion of the shaft 48 with a screw member 64. The degree of opening of the valve body 50 is detected through detection of a position of the gear plate 46 in the rotational direction using a rotation angle sensor (not shown).

The gear plate 46 is a gear formed of a hard resin material. The gear plate 46 is rotated by receiving the rotational force of the idle gear 56. The gear plate 46 has a gear portion 46a in part of an outer peripheral portion thereof. The gear portion 46a is engaged with a small diameter gear portion 56b formed in the idle gear 56.

The holding member 66 has a substantially cylindrical shape and holds the second seat member 70. The holding member 66 is formed in the axial direction of the fluid path 41 and has an insertion portion 66a and a flange portion 66b. The insertion portion 66a is inserted into the fluid path 41. The flange portion 66b protrudes radially outwardly from an outer peripheral surface of the insertion portion 66a at one axial end of the insertion portion 66a.

The insertion portion 66a has an annular step portion 66d, which communicates with the hole portion 66c and has an diameter larger than that of the hole portion 66c. A sealing member 68 is attached to the insertion portion 66a in the outer peripheral surface of the insertion portion 66a. The sealing member 68 closes a gap between the holding member 66 and the body 40 in a liquid-tight or air-tight manner. The holding member 66 is secured to the second surface 40a of the body 40 with bolts (not shown) through the flange portion 66b.

The second seat member 70, which has a cylindrical shape and is formed of resin or metal, is engaged with the annular step portion 66d. The second seat member 70 has a contact surface (seat surface) 70c on the valve body 50 side (on the side of an axial end surface 70a side) of an inner peripheral surface 70b. The contact surface 70c can be in contact with an outer peripheral surface of the valve body 50. The contact surface 70c has an arc shape in longitudinal sectional view and has a diameter that gradually increases toward the central axis of the valve body 50. The contact surface 70c is a surface that has the arc shape in longitudinal sectional view and is convex or concave toward the central axis of the valve body 50. A sealing member 70d is attached to the second seat member 70 in an outer peripheral surface of the second seat member 70. The sealing member 70d closes a gap between the second seat member 70 and the holding member 66 in a liquid-tight or air-tight manner.

Figure 2:
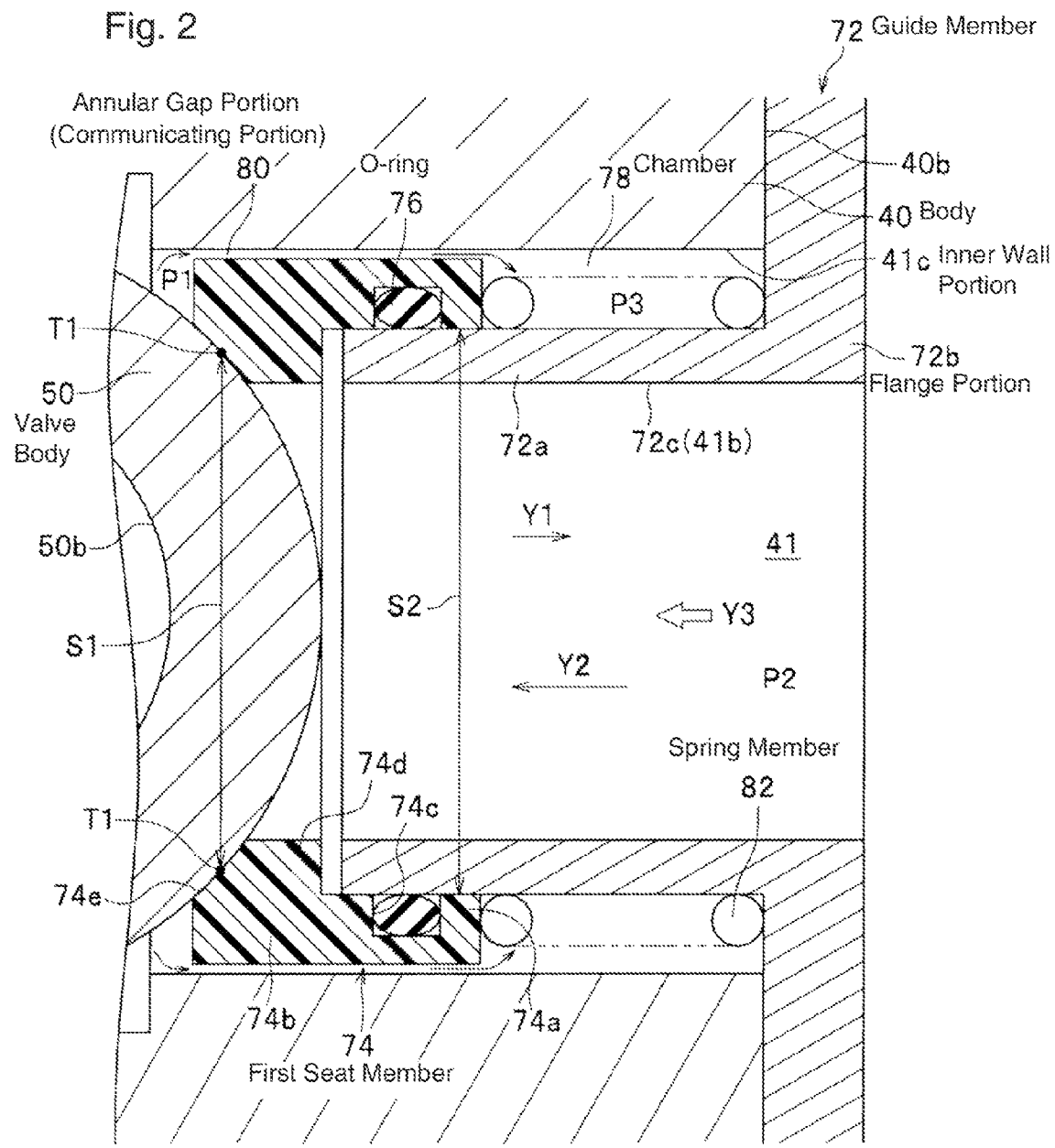
FIG. 2 is an enlarged longitudinal sectional view of part of the valve device illustrated in FIG. 1.
Figure 3:
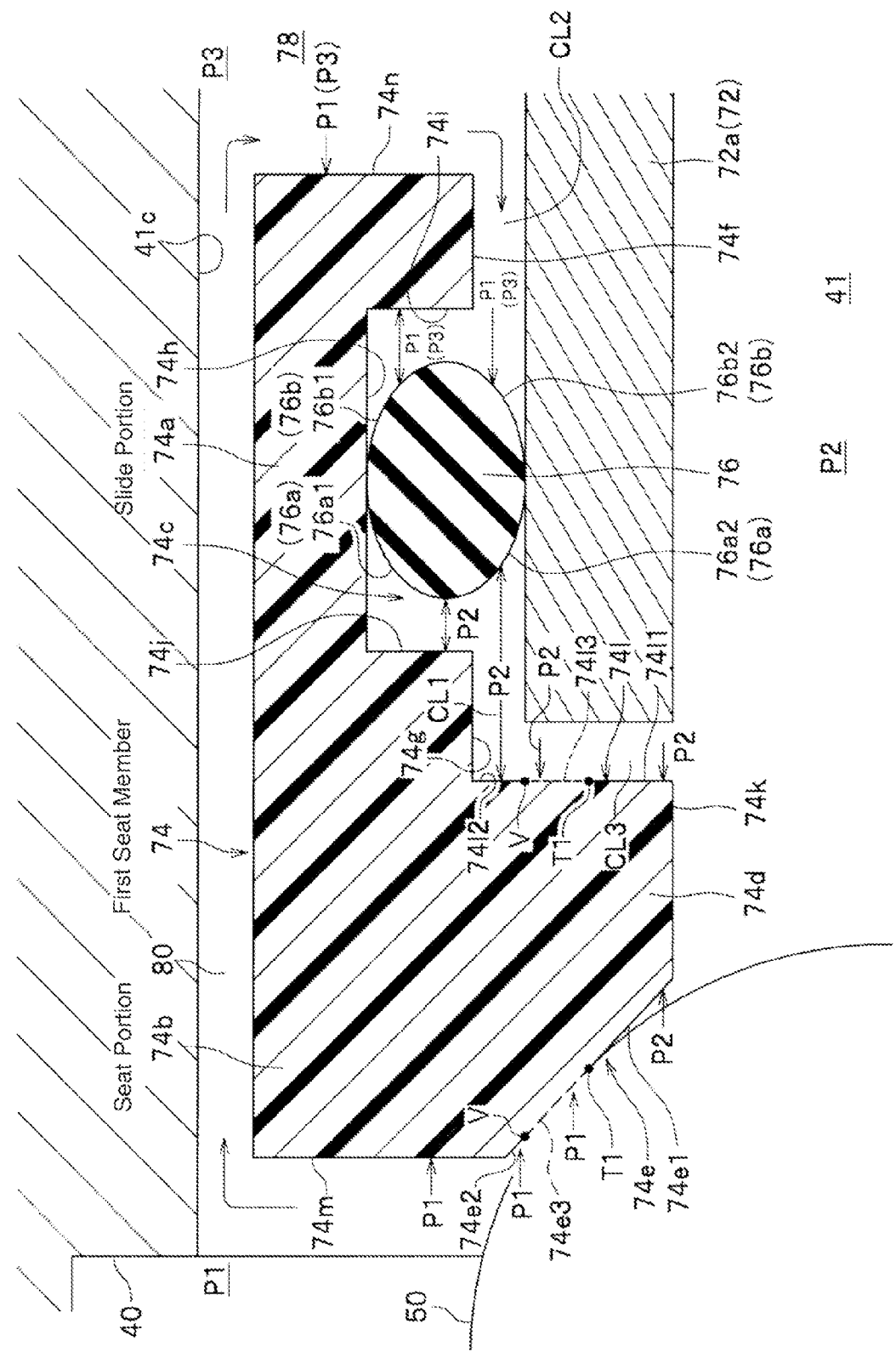
FIG. 3 is an enlarged view of part of the structure illustrated in FIG. 2, illustrating forces exerted on a first seat member and an O-ring.

Next, the guide member 72, the first seat member 74, an O-ring 76, a chamber 78, a gap portion 80, and a spring member 82 will be described with reference to FIGS. 2 and 3. FIG. 2 is an enlarged longitudinal sectional view of part of the on-off valve 36a illustrated in FIG. 1. FIG. 3 is an enlarged view of part of the structure illustrated in FIG. 2, illustrating forces exerted on the first seat member and the O-ring.

For convenience of description, the spring member 82 is omitted and gaps are provided between a groove portion 74c and sides of the O-ring 76 in the axial direction in FIG. 3.

As illustrated in FIG. 2, the guide member 72, which is substantially cylindrically shaped, holds the first seat member 74 and the spring member 82 and supports the first seat member 74 such that the first seat member 74 is slidable relative to the guide member 72.

The guide member 72 opposes (is spaced apart by a specified distance from) the valve body 50 in the axial direction of the fluid path 41. The guide member 72 is formed in the axial direction of the fluid path 41 and has an insertion portion 72a and a flange portion 72b. The insertion portion 72a is inserted into the fluid path 41. The flange portion protrudes radially outwardly from an outer peripheral surface of the insertion portion 72a at one axial end of the insertion portion 72a.

An outer diameter of the insertion portion 72a is smaller than an inner diameter of an inner wall portion 41c of the fluid path 41. The body 40 has an annular chamber 78 therein, which is surrounded by the inner wall portion 41c of the fluid path 41, the insertion portion 72a and flange portion 72b of the guide member 72, and the first seat member 74.

The flange portion 72b serving as a support portion extends in a direction substantially perpendicular to the axial direction from the outer peripheral surface of the insertion portion 72a in an end portion located opposite to the valve body 50. The guide member 72 is secured to the first surface 40b of the body 40 with bolts (not shown) through the flange portion 72b. The circle-shaped hole portion 72c is formed along the central axis of the guide member 72 extending through the guide member 72 in the axial direction of the fluid path 41.

The first seat member 74 and the second seat member 70 each have a cylindrical shape and are formed of resin or metal. The first seat member 74 and the second seat member 70 cooperate with each other (see FIG. 1) from the respective axial sides of the fluid path 41 so as to allow the valve body 50 to be seated thereon. That is, the first seat member 74 presses the valve body 50 with the urging force of the spring member 82 so as to seat the valve body 50.

The first seat member 74 is attached to the outer peripheral surface of the insertion portion 72a and has a slide portion 74a and a seat portion 74b. The slide portion 74a is slidable along the outer peripheral surface of the insertion portion 72a. The seat portion 74b is continuous with an axial end of the slide portion 74a and contacts the valve body 50.

The slide portion 74a has a cylindrical shape, the outer diameter of which is uniform in the axial direction. As illustrated in FIG. 3, an inner peripheral surface of the slide portion 74a has a first intermediate diameter surface 74f, a second intermediate diameter surface 74g, a large diameter surface 74h, a first step connecting surface 74i, and a second step connecting surface 74j. The first intermediate diameter surface 74f and the second intermediate diameter surface 74g each have a diameter larger than a diameter of a small diameter surface 74k, which will be described later, and each have a uniform inner diameter in the axial direction. The large diameter surface 74h has a diameter larger than those of the first intermediate diameter surface 74f and the second intermediate diameter surface 74g and has a uniform inner diameter in the axial direction. The first step connecting surface 74i and the second step connecting surface 74j extend in radial directions. The first step connecting surface 74i connects the large diameter surface 74h to the first intermediate diameter surface 74f. The second step connecting surface 74j connects the large diameter surface 74h to the second intermediate diameter surface 74g.

The large diameter surface 74h, the first step connecting surface 74i, and the second step connecting surface 74j define the annular groove portion 74c. The first intermediate diameter surface 74f and the second intermediate diameter surface 74g are included in sliding surfaces that are slidably in contact with the outer peripheral surface of the insertion portion 72a. The first intermediate diameter surface 74f is continuous with a radially extending first axial end surface 74n.

The O-ring 76 is attached to the inner peripheral surface of the slide portion 74a through the annular groove portion 74c. That is, the O-ring 76 serving as a sealing member is disposed between the inner peripheral surface of the slide portion 74a and the outer peripheral surface of the insertion portion 72a and spaced apart from the chamber 78 by a specified distance in the axial direction of the fluid path 41.

The O-ring 76 is pressed against the inner peripheral surface of the slide portion 74a (groove portion 74c) and the outer peripheral surface of the insertion portion 72a of the guide member 72 at the respective sides of the O-ring 76 in the radial directions (see FIG. 3). Small gaps CL1 and CL2 are formed between the slide portion 74a and the insertion portion 72a. The gap CL1 allows communication between a portion of the fluid path 41 on the first seat member 74 side and the groove portion 74c (more specifically, part of the groove portion 74c closer to the valve body 50 than the O-ring 76 is). The gap CL2 allows communication between the chamber 78 and the groove portion 74c (more specifically, part of the groove portion 74c closer to the chamber 78 than the O-ring 76 is). With the above-described structure, when the first seat member 74 side of the fluid path 41 is under a negative pressure, the fluid on the first seat member 74 side of the fluid path 41 flows into the groove portion 74c through the gap CL1, and the fluid in the chamber 78 flows into the groove portion 74c through the gap CL2. In FIG. 3, the gaps CL1 and CL2 are significantly enlarged relative to the surrounding components for convenience of description.

In the following description, out of portions of the O-ring 76 on both sides in the axial direction, a surface on which the pressure from the first seat member 74 side of the fluid path 41 is exerted is referred to as a second pressure receiving surface 76a, and a surface on which the pressure from the chamber 78 is exerted is referred to as a first pressure receiving surface 76b.

Referring back to FIG. 2, a step portion 74d is formed on an inner peripheral surface of the seat portion 74b. The step portion 74d has an inner diameter smaller than that of the slide portion 74a and substantially equal to that of the guide member 72. That is, as illustrated in FIG. 3, an inner peripheral surface of the seat portion 74b has the small diameter surface 74k, a contact surface (seat surface) 74e, and a third step connecting surface 74l. The small diameter surface 74k has a diameter smaller than those of the first intermediate diameter surface 74f and the second intermediate diameter surface 74g and has a uniform inner diameter in the axial direction. The contact surface 74e connects the small diameter surface 74k to a radially extending second axial end surface 74m and can be in contact with the outer peripheral surface of the valve body 50. The third step connecting surface 74l radially extends and connects the small diameter surface 74k to the second intermediate diameter surface 74g.

The step portion 74d is spaced apart by a specified distance from the insertion portion 72a on the valve body 50 side. A gap CL3, which is formed between the third step connecting surface 74l and the insertion portion 72a, communicates with the gap CL1.

The contact surface 74e has an arc shape in longitudinal sectional view and has a diameter that gradually increases toward the central axis of the valve body 50. The contact surface 74e is a surface that has the arc shape in longitudinal sectional view and is convex or concave toward the central axis of the valve body 50. The step portion 74d may be omitted. In this case, the seat portion 74b has the same inner diameter as that of the slide portion 74a and has the contact surface 74e formed in the inner peripheral surface thereof on the valve body 50 side.

As illustrated in FIG. 2, an outer diameter of the first seat member 74 is slightly smaller than the inner diameter of the inner wall portion 41c of the fluid path 41. Thus, the annular gap portion (communicating portion) 80, which allows communication between the valve body 50 side and the chamber 78 of the fluid path 41, is formed in the body 40. Alternatively, the outer diameter of the first seat member 74 may be equal to the inner diameter of the inner wall portion 41c of the fluid path 41. In this case, a groove portion that allows communication between the valve body 50 side and the chamber 78 of the fluid path 41 is formed in the outer peripheral surface of the first seat member 74, or a hole portion (through hole) that allows communication between the valve body 50 side and the chamber 78 of the fluid path 41 is formed in the first seat member 74.

The spring member 82 is adequately selected from among known springs. As an example, a coil spring is used to urge the first seat member 74 toward the valve body 50. The spring member 82 is disposed in the chamber 78 while being attached to the outer peripheral surface of the insertion portion 72a of the guide member 72. Axial ends of the spring member 82 are fastened to the flange portion 72b of the guide member 72 and the slide portion 74a of the first seat member 74.

The on-off valve (valve device) 36a generally has the above-described structure. Next, forces exerted on the O-ring 76 on the first seat member 74 side of the fluid path 41 and the first seat member 74 will be described with reference to FIGS. 2 and 3 where appropriate.

Since the valve body 50 side of the fluid path 41 communicates with the outside of the on-off valve 36a through the air pump 26 (see FIG. 1), when operation of the fuel cell system 10 is stopped, the atmosphere flows into the valve body 50 side of the fluid path 41 from outside. This sets the pressure on the valve body 50 side of the fluid path 41 (hereafter, referred to as "valve side pressure P1") to the atmospheric pressure.

Since the first seat member 74 side of the fluid path 41 communicates with the cathode channel 24 of the fuel cell unit 12 (see FIG. 1), when operation of the fuel cell system 10 is stopped, pressure on the first seat member 74 side of the fluid path 41 (hereafter, referred to as "seat member side pressure P2") decreases to a negative pressure. Thus, the valve side pressure P1 is higher than the seat member side pressure P2 (P1>P2).

In this state, as illustrated in FIG. 3, the seat member side pressure P2 is exerted on a portion 74e1 and a portion 74l1. The portion 74e1 is part of the contact surface 74e radially further toward the inside than a contact portion T1, which is in contact with the valve body 50. The portion 74l1 is part of the third step connecting surface 74l radially further toward the inside than a projected position on the third step connecting surface 74l, the projected position being a position at which the contact portion T1 is projected. Since a pressure receiving area of the portion 74e1 is equal to (substantially equal to) a pressure receiving area of the 74l1, a pressing force exerted on the portion 74e1 of the contact surface 74e in a direction in which the first seat member 74 is moved away from the valve body 50 by the seat member side pressure P2 and a pressing force exerted on the portion 74l1 of the third step connecting surface 74*l* in a direction in which the first seat member 74 is moved toward the valve body 50 by the seat member side pressure P2 cancel each other out.

Furthermore, since the fluid on the first seat member 74 side flows into the groove portion 74*c* (more specifically, into a portion of the groove portion 74*c* closer to the valve body 50 than the O-ring 76 is) through the gaps CL1 and CL3, the seat member side pressure P2 is exerted on the second step connecting surface 74*j* and the second pressure receiving surface 76*a* of the O-ring 76. Since a pressure receiving area of the second step connecting surface 74*j* is equal to (substantially equal to) a pressure receiving area of a portion 76*a*1, which is part of the second pressure receiving surface 76*a* other than the part of the second pressure receiving surface 76*a* corresponding to the gap CL1, a pressing force exerted on the second step connecting surface 74*j* in a direction in which the first seat member 74 is moved toward the valve body 50 by the seat member side pressure P2 and a pressing force exerted on the portion 76*a*1 of the second pressure receiving surface 76*a* in a direction in which the first seat member 74 is moved away from the valve body 50 by the seat member side pressure P2 cancel each other out.

The seat member side pressure P2 is exerted on the third step connecting surface 74*l* and the second pressure receiving surface 76*a* of the O-ring 76. Since a pressure receiving area of a portion 74*l*2, which is part of the third step connecting surface 74*l* corresponding to the gap CL1, is equal to (substantially equal to) a pressure receiving area of a portion 76*a*2, which is part of the second pressure receiving surface 76*a* corresponding the gap CL1, a pressing force exerted on the portion 74*l*2 of the third step connecting surface 74*l* in a direction in which the first seat member 74 is moved toward the valve body 50 by the seat member side pressure P2 and a pressing force exerted on the portion 76*a*2 of the second pressure receiving surface 76*a* in a direction in which the first seat member 74 is moved away from the valve body 50 by the seat member side pressure P2 cancel each other out.

In the present embodiment, since the fluid (atmosphere) on the valve body 50 side of the fluid path 41 flows into the chamber 78 through the gap portion 80, pressure P3 of the chamber 78 is the same (substantially the same) as the valve side pressure P1 and higher than the seat member side pressure P2 (P3=P1, P3>P2).

In the following description, the pressure P3 of the chamber 78 may also be referred to as the "valve side pressure P1".

Since the fluid in the chamber 78 flows into the groove portion 74*c* (more specifically, into a portion of the groove portion 74*c* closer to the chamber 78 than the O-ring 76 is) through the gap CL2, the valve side pressure P1 is exerted on the first step connecting surface 74*i* and the first pressure receiving surface 76*b* of the O-ring 76. Since a pressure receiving area of the first step connecting surface 74*i* is equal to (substantially equal to) a pressure receiving area of a portion 76*b*1, which is part of the first pressure receiving surface 76*b* other than the part of the first pressure receiving surface 76*b* corresponding to the gap CL2, a pressing force exerted on the first step connecting surface 74*i* in a direction in which the first seat member 74 is moved away from the valve body 50 by the valve side pressure P1 and a pressing force exerted on the portion 76*b*1 of the first pressure receiving surface 76*b* in a direction in which the first seat member 74 is moved toward the valve body 50 by the valve side pressure P1 cancel each other out.

The valve side pressure P1 is exerted on the second axial end surface 74*m*, a portion 74*e*2, which is part of the contact surface 74*e* radially further toward the outside than a point V, the first axial end surface 74*n*, and a portion 76*b*2, which is part of the first pressure receiving surface 76*b* of the O-ring 76 corresponding to the gap CL2. Since the sum of pressure receiving areas of the second axial end surface 74*m* and the portion 74*e*2 of the contact surface 74*e* is equal to (substantially equal to) the sum of pressure receiving areas of the first axial end surface 74*n* and the portion 76*b*2 of the first pressure receiving surface 76*b*, pressing forces exerted on the second axial end surface 74*m* and the portion 74*e*2 of the contact surface 74*e* in directions in which the first seat member 74 is moved away from the valve body 50 by the valve side pressure P1 and pressing forces exerted on the first axial end surface 74*n* and the portion 76*b*2 of the first pressure receiving surface 76*b* in directions in which the first seat member 74 is moved toward the valve body 50 by the valve side pressure P1 cancel each other out.

The valve side pressure P1 acting in a direction in which the first seat member 74 is moved away from the valve body 50 is exerted on a portion 74*e*3 (see dashed line in FIG. 3), which is part of the contact surface 74*e* other than the portions 74*e*1 and 74*e*2, and the seat member side pressure P2 acting in a direction in which the first seat member 74 is moved toward the valve body 50 is exerted on a portion 74*l*3 (see dashed line in FIG. 3), which is part of the third step connecting surface 74*l* other than the portions 74*l*1 and 74*l*2.

A pressure receiving area of the portion 74*e*3 of the contact surface 74*e* is equal to (substantially equal to) a pressure receiving area of the portion 74*l*3 of the third step connecting surface 74*l*, and the valve side pressure P1 is higher than the seat member side pressure P2. Thus, there exist portions of the first seat member 74 where pressing forces exerted thereon are not canceled out (see the dashed lines in FIG. 3).

Referring to FIG. 2, a pressure receiving area of the portions where pressing forces exerted thereon are not canceled out is given by subtracting S1 from S2 (S2−S1), where S2 is an outer diameter area of the cross section of the insertion portion 72*a* of the guide member 72, and S1 is an area of the cross section of the part of the first seat member 74 radially further toward the inside than the contact portion T1, which is in contact with the valve body 50. It is noted that the area S1 refers to a cross-sectional area including a cross-sectional area of the hole portion formed in a central portion of the first seat member 74, and the outer diameter area S2 refers to a cross-sectional area including a cross-sectional area of the hole portion 72*c* formed at a central portion of the guide member 72.

As a result, a force ((P1−P2)×(S2−S1)=force Y1 due to differential pressure) is exerted on the first seat member 74 in a direction in which the first seat member 74 is moved away from the valve body 50.

Thus, in the present embodiment, as illustrated in FIG. 3, the fluid (atmosphere) on the valve body 50 side of the fluid path 41 flows into the chamber 78 through the gap portion 80 and the fluid in the chamber 78 flows into the groove portion 74*c* through the gap CL2. Accordingly, the valve side pressure P1 is exerted on the first axial end surface 74*n* of the first seat member 74 and the portion 76*b*2 of the first pressure receiving surface 76*b*. Compared to the related-art, in the first seat member 74 and the O-ring 76, the sizes of portions where pressing forces exerted thereon are canceled out can be increased and the sizes of portions where pressing forces exerted thereon are not canceled out can be decreased. Thus, the force (force Y1 due to differential pressure) acting in a direction separating away from the valve body 50 can be decreased.

Thus, according to the present embodiment, seating properties of the first seat member 74 on the first seat member 74 side of the fluid path 41 are improved. As a result, compared to the related art, the urging force Y2 of the spring member 82 does not need to be increased. Accordingly, an increase in operational friction during rotation of the valve body 50 can be prevented and an increase in wear of the first seat member 74 can be prevented, thereby permitting the life of the first seat member 74 to be increased. When the fuel cell system 10 is operated, the valve body 50 can be reliably seated on the first seat member 74 due to the urging force Y2 of the spring member 82. Thus, the seating properties of the first seat member 74 with respect to the valve body 50 can be constantly maintained.

Although a preferred embodiment has been described, the present invention is not limited to the embodiment. Changes in design can be adequately performed without departing from the gist of the present invention.

In the present embodiment, the valve device has been described in the case where the valve side pressure P1 is the atmospheric pressure and the seat member side pressure P2 is negative. However, the valve device is not limited to this. The valve device is applicable in the case, for example, where the valve side pressure P1 is positive and the seat member side pressure P2 is negative, or the case where the valve side pressure P1 is positive (greater) and the seat member side pressure P2 is positive (smaller). That is, the valve device is applicable when the relationship between the valve side pressure P1 and the seat member side pressure P2 is that the valve side pressure P1 is greater than the seat member side pressure P2 (P1>P2).

In the present embodiment, the valve device is applied to the on-off valve 36a provided in the cathode system 16 of the fuel cell system 10. However, this does not limit application of the valve device according to the present invention. The valve device according to the present invention is also applicable to any of the valve devices provided in a given locations of a variety of systems (devices).

The valve device according to the present invention is also applicable to the on-off valve 36b and the back pressure valve 38 provided in the cathode system 16 of the fuel cell system 10.

What is claimed is:

1. A valve device comprising:
a body having a fluid path in the body;
a sphere-shaped valve disposed in the fluid path, the valve opening and closing the fluid path;
a guide member disposed so as to oppose the valve in the axial direction of the fluid path, the guide member having a support portion on an outer peripheral surface of the guide member, the support portion extending in a direction substantially perpendicular to the axial direction;
a cylinder-shaped seat member disposed such that the seat member is slidable along the outer peripheral surface of the guide member, the valve being seated on the seat member;
a sealing member disposed between an inner peripheral surface of the seat member and the outer peripheral surface of the guide member;
a chamber surrounded by an inner wall portion of the fluid path, the outer peripheral surface of the guide member, the support portion, and the seat member; and
a spring member disposed in the chamber, the spring member urging the seat member toward the valve; and
a channel defined by the inner wall portion of the fluid path and the seat member, wherein
the seat member comprises a seat portion and a slide portion,
a step portion is formed on an inner peripheral surface of the seat portion,
an inner diameter of the step portion is smaller than an inner diameter of the slide portion,
the inner diameter of the step portion is substantially equal to an inner diameter of the guide member,
the step portion comprises a seat surface configured to contact an outer peripheral surface of the valve, and
the channel is configured to allow fluid communication between a valve side of the fluid path and the chamber.

2. The valve device of claim 1, wherein a fluid pressure inside the chamber is substantially equal to a fluid pressure inside the valve side of the fluid path.

3. The valve device of claim 1, wherein a fluid pressure inside the chamber is greater than a pressure inside a seat member side of the fluid path.

* * * * *